(12) United States Patent
Marshall et al.

(10) Patent No.: US 7,929,530 B2
(45) Date of Patent: Apr. 19, 2011

(54) ANCILLARY DATA SUPPORT IN SESSION INITIATION PROTOCOL (SIP) MESSAGING

(75) Inventors: Roger S. Marshall, Auburn, WA (US); Yinjun Zhu, Sammamish, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 247 days.

(21) Appl. No.: 12/292,921

(22) Filed: Dec. 1, 2008

(65) Prior Publication Data
US 2009/0147775 A1 Jun. 11, 2009

Related U.S. Application Data

(60) Provisional application No. 60/996,700, filed on Nov. 30, 2007.

(51) Int. Cl.
*H04L 12/28* (2006.01)
*H04L 12/56* (2006.01)

(52) U.S. Cl. .................................................... 370/389

(58) Field of Classification Search .................. None
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor et al. |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,177,478 A | 1/1993 | Wagai |

(Continued)

FOREIGN PATENT DOCUMENTS

SE    PCT/SE/01887    10/1998

(Continued)

OTHER PUBLICATIONS 47 code of federal regulations (Oct. 1, 2005 Edition).

(Continued)

*Primary Examiner* — Ayaz R Sheikh
*Assistant Examiner* — Blanche Wong
(74) *Attorney, Agent, or Firm* — William H. Bollman

(57) ABSTRACT

A SIP ancillary data server provides host to auxiliary data for an emergency SIP session (call) uniquely referred to in a transported SIP header. In a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

20 Claims, 3 Drawing Sheets

U.S. PATENT DOCUMENTS

| | | |
|---|---|---|
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithil et al. |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |

| Patent | Type | Date | Name |
|---|---|---|---|
| 6,169,902 | B1 | 1/2001 | Kawamoto |
| 6,173,181 | B1 | 1/2001 | Losh |
| 6,178,505 | B1 | 1/2001 | Schnieder |
| 6,178,506 | B1 | 1/2001 | Quick, Jr. |
| 6,181,935 | B1 | 1/2001 | Gossman |
| 6,188,354 | B1 | 2/2001 | Soliman |
| 6,188,752 | B1 | 2/2001 | Lesley |
| 6,188,909 | B1 | 2/2001 | Alanara |
| 6,189,098 | B1 | 2/2001 | Kaliski, Jr. |
| 6,195,557 | B1 | 2/2001 | Havinis |
| 6,198,431 | B1 | 3/2001 | Gibson |
| 6,199,045 | B1 | 3/2001 | Giniger |
| 6,199,113 | B1 | 3/2001 | Alegre |
| 6,205,330 | B1 | 3/2001 | Windbladh |
| 6,208,290 | B1 | 3/2001 | Krasner |
| 6,208,854 | B1 | 3/2001 | Roberts |
| 6,215,441 | B1 | 4/2001 | Moeglein |
| 6,219,557 | B1 | 4/2001 | Havinis |
| 6,223,046 | B1 | 4/2001 | Hamill-Keays |
| 6,226,529 | B1 | 5/2001 | Bruno |
| 6,239,742 | B1 | 5/2001 | Krasner |
| 6,247,135 | B1 | 6/2001 | Feaugue |
| 6,249,680 | B1 | 6/2001 | Wax |
| 6,249,744 | B1 | 6/2001 | Morita |
| 6,249,873 | B1 | 6/2001 | Richard |
| 6,253,203 | B1 | 6/2001 | O'Flaherty |
| 6,260,147 | B1 | 7/2001 | Quick, Jr. |
| 6,266,614 | B1 | 7/2001 | Alumbaugh |
| 6,275,692 | B1 | 8/2001 | Skog |
| 6,275,849 | B1 | 8/2001 | Ludwig |
| 6,289,373 | B1 | 9/2001 | Dezonno |
| 6,297,768 | B1 | 10/2001 | Allen, Jr. |
| 6,307,504 | B1 | 10/2001 | Sheynblat |
| 6,308,269 | B2 | 10/2001 | Proidl |
| 6,313,786 | B1 | 11/2001 | Sheynblat |
| 6,317,594 | B1 | 11/2001 | Gossman |
| 6,321,091 | B1 | 11/2001 | Holland |
| 6,321,257 | B1 | 11/2001 | Kotola |
| 6,324,542 | B1 | 11/2001 | Wright, Jr. et al. |
| 6,327,473 | B1 | 12/2001 | Soliman |
| 6,327,479 | B1 | 12/2001 | Mikkola |
| 6,333,919 | B2 | 12/2001 | Gaffney |
| 6,360,093 | B1 | 3/2002 | Ross |
| 6,363,254 | B1 | 3/2002 | Jones |
| 6,367,019 | B1 | 4/2002 | Ansell |
| 6,370,389 | B1 | 4/2002 | Isomursu |
| 6,377,209 | B1 | 4/2002 | Krasner |
| 6,400,314 | B1 | 6/2002 | Krasner |
| 6,400,958 | B1 | 6/2002 | Isomursu |
| 6,411,254 | B1 | 6/2002 | Moeglein |
| 6,421,002 | B2 | 7/2002 | Krasner |
| 6,433,734 | B1 | 8/2002 | Krasner |
| 6,434,381 | B1 | 8/2002 | Moore |
| 6,442,391 | B1 | 8/2002 | Johansson |
| 6,449,473 | B1 | 9/2002 | Raivisto |
| 6,449,476 | B1 | 9/2002 | Hutchison, IV |
| 6,456,852 | B2 | 9/2002 | Bar |
| 6,463,272 | B1 | 10/2002 | Wallace |
| 6,477,150 | B1 | 11/2002 | Maggenti |
| 6,504,491 | B1 | 1/2003 | Christians |
| 6,505,049 | B1 | 1/2003 | Dorenbosch |
| 6,510,387 | B2 | 1/2003 | Fuchs |
| 6,512,922 | B1 | 1/2003 | Burg |
| 6,512,930 | B2 | 1/2003 | Sandegren |
| 6,515,623 | B2 | 2/2003 | Johnson |
| 6,519,466 | B2 | 2/2003 | Pande |
| 6,522,682 | B1 | 2/2003 | Kohli |
| 6,529,722 | B1 | 3/2003 | Heinrich |
| 6,529,829 | B2 | 3/2003 | Turetzky |
| 6,531,982 | B1 | 3/2003 | White |
| 6,538,757 | B1 | 3/2003 | Sansone |
| 6,539,200 | B1 | 3/2003 | Schiff |
| 6,539,304 | B1 | 3/2003 | Chansarkar |
| 6,542,464 | B1 | 4/2003 | Takeda |
| 6,542,734 | B1 | 4/2003 | Abrol |
| 6,542,743 | B1 | 4/2003 | Soliman |
| 6,549,522 | B1 | 4/2003 | Flynn |
| 6,549,776 | B1 | 4/2003 | Joong |
| 6,549,844 | B1 | 4/2003 | Egberts |
| 6,556,832 | B1 | 4/2003 | Soliman |
| 6,560,461 | B1 | 5/2003 | Fomukong |
| 6,560,534 | B2 | 5/2003 | Abraham |
| 6,570,530 | B2 | 5/2003 | Gaal |
| 6,571,095 | B1 | 5/2003 | Koodli |
| 6,574,558 | B2 | 6/2003 | Kohli |
| 6,580,390 | B1 | 6/2003 | Hay |
| 6,584,552 | B1 | 6/2003 | Kuno et al. |
| 6,594,500 | B2 | 7/2003 | Bender |
| 6,597,311 | B2 | 7/2003 | Sheynblat |
| 6,600,927 | B2 | 7/2003 | Hamilton |
| 6,603,973 | B1 | 8/2003 | Foladare |
| 6,606,495 | B1 | 8/2003 | Korpi |
| 6,606,554 | B2 | 8/2003 | Edge |
| 6,609,004 | B1 | 8/2003 | Morse |
| 6,611,757 | B2 | 8/2003 | Brodie |
| 6,618,670 | B1 | 9/2003 | Chansarkar |
| 6,621,452 | B2 | 9/2003 | Knockeart |
| 6,628,233 | B2 | 9/2003 | Knockeart |
| 6,633,255 | B2 | 10/2003 | Krasner |
| 6,640,184 | B1 | 10/2003 | Rabe |
| 6,650,288 | B1 | 11/2003 | Pitt |
| 6,661,372 | B1 | 12/2003 | Girerd |
| 6,665,539 | B2 | 12/2003 | Sih |
| 6,665,541 | B1 | 12/2003 | Krasner |
| 6,671,620 | B1 | 12/2003 | Garin |
| 6,677,894 | B2 | 1/2004 | Sheynblat |
| 6,680,694 | B1 | 1/2004 | Knockheart |
| 6,691,019 | B2 | 2/2004 | Seeley |
| 6,694,258 | B2 | 2/2004 | Johnson |
| 6,697,629 | B1 | 2/2004 | Grilli |
| 6,698,195 | B1 | 3/2004 | Hellinger |
| 6,701,144 | B2 | 3/2004 | Kirbas |
| 6,703,971 | B2 | 3/2004 | Pande et al. |
| 6,703,972 | B2 | 3/2004 | Van Diggelen |
| 6,704,651 | B2 | 3/2004 | Van Diggelen |
| 6,707,421 | B1 | 3/2004 | Drury |
| 6,714,793 | B1 | 3/2004 | Carey |
| 6,718,174 | B2 | 4/2004 | Vayanos |
| 6,720,915 | B2 | 4/2004 | Sheynblat |
| 6,721,578 | B2 | 4/2004 | Minear |
| 6,721,871 | B2 | 4/2004 | Piispanen |
| 6,724,342 | B2 | 4/2004 | Bloebaum |
| 6,725,159 | B2 | 4/2004 | Krasner |
| 6,728,701 | B1 | 4/2004 | Stoica |
| 6,731,940 | B1 | 5/2004 | Nagendran |
| 6,734,821 | B2 | 5/2004 | Van Diggelen |
| 6,738,013 | B2 | 5/2004 | Orler |
| 6,738,800 | B1 | 5/2004 | Aquilon |
| 6,741,842 | B2 | 5/2004 | Goldberg |
| 6,744,856 | B2 | 6/2004 | Karnik |
| 6,744,858 | B1 | 6/2004 | Ryan |
| 6,745,038 | B2 | 6/2004 | Callaway, Jr. |
| 6,747,596 | B2 | 6/2004 | Orler |
| 6,748,195 | B1 | 6/2004 | Phillips |
| 6,751,464 | B1 | 6/2004 | Burg |
| 6,756,938 | B2 | 6/2004 | Zhao |
| 6,757,544 | B2 | 6/2004 | Rangarajan |
| 6,771,742 | B2 | 8/2004 | McCalmont et al. |
| 6,772,340 | B1 | 8/2004 | Peinado |
| 6,775,655 | B1 | 8/2004 | Peinado et al. |
| 6,775,802 | B2 | 8/2004 | Gaal |
| 6,778,136 | B2 | 8/2004 | Gronemeyer |
| 6,778,885 | B2 | 8/2004 | Agashe |
| 6,781,963 | B2 | 8/2004 | Crockett |
| 6,788,249 | B1 | 9/2004 | Farmer |
| 6,795,699 | B1 | 9/2004 | McGraw |
| 6,799,049 | B1 | 9/2004 | Zellner |
| 6,799,050 | B1 | 9/2004 | Krasner |
| 6,801,159 | B2 | 10/2004 | Swope |
| 6,804,524 | B1 | 10/2004 | Vandermaijden |
| 6,807,534 | B1 | 10/2004 | Erickson |
| 6,810,323 | B1 | 10/2004 | Bullock |
| 6,813,560 | B2 | 11/2004 | Van Diggelen |
| 6,816,111 | B2 | 11/2004 | Krasner |
| 6,816,710 | B2 | 11/2004 | Krasner |
| 6,816,719 | B1 | 11/2004 | Heinonen |
| 6,816,734 | B2 | 11/2004 | Wong |
| 6,820,269 | B2 | 11/2004 | Baucke et al. |

| | | | |
|---|---|---|---|
| 6,829,475 B1 | 12/2004 | Lee et al. | |
| 6,832,373 B2 | 12/2004 | O'Neill | |
| 6,839,020 B2 | 1/2005 | Geier | |
| 6,839,021 B2 | 1/2005 | Sheynblat | |
| 6,842,715 B1 | 1/2005 | Gaal | |
| 6,847,822 B1 | 1/2005 | Dennison | |
| 6,853,916 B2 | 2/2005 | Fuchs | |
| 6,856,282 B2 | 2/2005 | Mauro | |
| 6,861,980 B1 | 3/2005 | Rowitch | |
| 6,865,171 B1 | 3/2005 | Nilsson | |
| 6,865,395 B2 | 3/2005 | Riley | |
| 6,867,733 B2 | 3/2005 | Sandhu | |
| 6,867,734 B2 | 3/2005 | Voor | |
| 6,873,854 B2 | 3/2005 | Crockett | |
| 6,885,940 B2 | 4/2005 | Brodie | |
| 6,888,497 B2 | 5/2005 | King | |
| 6,888,932 B2 | 5/2005 | Snip | |
| 6,895,238 B2 | 5/2005 | Newell | |
| 6,895,249 B2 | 5/2005 | Gaal | |
| 6,900,758 B1 | 5/2005 | Mann | |
| 6,903,684 B1 | 6/2005 | Simic | |
| 6,904,029 B2 | 6/2005 | Fors | |
| 6,907,224 B2 | 6/2005 | Younis | |
| 6,907,238 B2 | 6/2005 | Leung | |
| 6,912,395 B2 | 6/2005 | Benes | |
| 6,912,545 B1 | 6/2005 | Lundy | |
| 6,915,208 B2 | 7/2005 | Garin | |
| 6,917,331 B2 | 7/2005 | Gronemeyer | |
| 6,930,634 B2 | 8/2005 | Peng | |
| 6,937,187 B2 | 8/2005 | Van Diggelen | |
| 6,937,597 B1 * | 8/2005 | Rosenberg et al. | 370/356 |
| 6,937,872 B2 | 8/2005 | Krasner | |
| 6,940,950 B2 | 9/2005 | Dickinson et al. | |
| 6,941,144 B2 | 9/2005 | Stein | |
| 6,944,540 B2 | 9/2005 | King | |
| 6,947,772 B2 | 9/2005 | Minear | |
| 6,950,058 B1 | 9/2005 | Davis | |
| 6,957,073 B2 | 10/2005 | Bye | |
| 6,961,562 B1 | 11/2005 | Ross | |
| 6,963,557 B2 | 11/2005 | Knox | |
| 6,965,754 B2 | 11/2005 | King | |
| 6,965,767 B2 | 11/2005 | Maggenti | |
| 6,970,917 B1 | 11/2005 | Kushwaha | |
| 6,973,320 B2 | 12/2005 | Brown | |
| 6,975,266 B2 | 12/2005 | Abraham | |
| 6,978,453 B2 | 12/2005 | Rao | |
| 6,980,816 B2 | 12/2005 | Rohler | |
| 6,996,720 B1 | 2/2006 | DeMello | |
| 6,999,782 B2 | 2/2006 | Shaughnessy | |
| 7,020,480 B2 | 3/2006 | Coskun | |
| 7,024,321 B1 | 4/2006 | Deninger | |
| 7,024,393 B1 | 4/2006 | Peinado | |
| 7,047,411 B1 | 5/2006 | DeMello | |
| 7,065,351 B2 | 6/2006 | Carter | |
| 7,065,507 B2 | 6/2006 | Mohammed | |
| 7,079,857 B2 | 7/2006 | Maggenti | |
| 7,092,385 B2 * | 8/2006 | Gallant et al. | 370/352 |
| 7,103,018 B1 | 9/2006 | Hansen | |
| 7,103,574 B1 | 9/2006 | Peinado | |
| 7,106,717 B2 | 9/2006 | Rousseau | |
| 7,136,838 B1 | 11/2006 | Peinado | |
| 7,151,946 B2 | 12/2006 | Maggenti | |
| 7,177,397 B2 | 2/2007 | McCalmont | |
| 7,177,399 B2 | 2/2007 | Dawson | |
| 7,200,380 B2 | 4/2007 | Havlark | |
| 7,209,758 B1 | 4/2007 | Moll | |
| 7,209,969 B2 | 4/2007 | Lahti et al. | |
| 7,218,940 B2 | 5/2007 | Niemenna | |
| 7,221,959 B2 | 5/2007 | Lindquist | |
| 7,321,773 B2 | 1/2008 | Hines | |
| 7,366,157 B1 | 4/2008 | Valentine | |
| 7,440,442 B2 * | 10/2008 | Grabelsky et al. | 370/352 |
| 7,522,581 B2 * | 4/2009 | Acharya et al. | 370/352 |
| 7,573,982 B2 | 8/2009 | Breen | |
| 7,702,081 B1 | 4/2010 | Klesper | |
| 7,783,297 B2 | 8/2010 | Ishii | |
| 2001/0011247 A1 | 8/2001 | O'Flaherty | |
| 2002/0037735 A1 | 3/2002 | Maggenti | |
| 2002/0052214 A1 | 5/2002 | Maggenti | |
| 2002/0061760 A1 | 5/2002 | Maggenti | |
| 2002/0069529 A1 | 6/2002 | Wieres | |
| 2002/0102996 A1 | 8/2002 | Jenkins | |
| 2002/0102999 A1 | 8/2002 | Maggenti | |
| 2002/0111172 A1 | 8/2002 | DeWolf | |
| 2002/0112047 A1 | 8/2002 | Kushwaha | |
| 2003/0009602 A1 | 1/2003 | Jacobs | |
| 2003/0013449 A1 | 1/2003 | Hose | |
| 2003/0016804 A1 | 1/2003 | Sheha | |
| 2003/0037163 A1 | 2/2003 | Kitada | |
| 2003/0040272 A1 | 2/2003 | Lelievre | |
| 2003/0065788 A1 | 4/2003 | Salomaki | |
| 2003/0072318 A1 | 4/2003 | Lam | |
| 2003/0078064 A1 | 4/2003 | Chan | |
| 2003/0081557 A1 | 5/2003 | Mettala | |
| 2003/0086539 A1 | 5/2003 | McCalmont | |
| 2003/0101329 A1 | 5/2003 | Lahti | |
| 2003/0101341 A1 | 5/2003 | Kettler | |
| 2003/0103484 A1 | 6/2003 | Oommen | |
| 2003/0114157 A1 | 6/2003 | Spitz | |
| 2003/0119521 A1 | 6/2003 | Tipnis et al. | |
| 2003/0119528 A1 | 6/2003 | Pew | |
| 2003/0137961 A1 | 7/2003 | Tsirtsis | |
| 2003/0153340 A1 | 8/2003 | Crockett | |
| 2003/0153341 A1 | 8/2003 | Crockett | |
| 2003/0153342 A1 | 8/2003 | Crockett | |
| 2003/0153343 A1 | 8/2003 | Crockett | |
| 2003/0161298 A1 | 8/2003 | Bergman | |
| 2003/0186709 A1 | 10/2003 | Rhodes | |
| 2003/0196105 A1 | 10/2003 | Fineberg | |
| 2003/0204640 A1 | 10/2003 | Sahineja | |
| 2003/0223381 A1 | 12/2003 | Schroderus | |
| 2004/0002326 A1 | 1/2004 | Maher | |
| 2004/0043775 A1 | 3/2004 | Kennedy | |
| 2004/0044623 A1 | 3/2004 | Wake | |
| 2004/0068724 A1 | 4/2004 | Gardner | |
| 2004/0098497 A1 | 5/2004 | Banet | |
| 2004/0132465 A1 | 7/2004 | Mattila | |
| 2004/0146040 A1 | 7/2004 | Phan-Anh | |
| 2004/0176123 A1 | 9/2004 | Chin | |
| 2004/0198332 A1 | 10/2004 | Lundsgaard | |
| 2004/0205151 A1 | 10/2004 | Sprigg | |
| 2004/0229632 A1 | 11/2004 | Flynn | |
| 2004/0242238 A1 | 12/2004 | Wang | |
| 2004/0267445 A1 | 12/2004 | De Luca | |
| 2005/0028034 A1 | 2/2005 | Gantman | |
| 2005/0039178 A1 | 2/2005 | Marolia | |
| 2005/0041578 A1 | 2/2005 | Huotari | |
| 2005/0043037 A1 | 2/2005 | Ioppe | |
| 2005/0053209 A1 | 3/2005 | D'Evelyn | |
| 2005/0086467 A1 | 4/2005 | Asokan | |
| 2005/0090236 A1 | 4/2005 | Schwinke | |
| 2005/0112030 A1 | 5/2005 | Gaus | |
| 2005/0134504 A1 | 6/2005 | Harwood | |
| 2005/0135569 A1 | 6/2005 | Dickinson | |
| 2005/0169248 A1 | 8/2005 | Truesdale | |
| 2005/0190892 A1 | 9/2005 | Dawson | |
| 2005/0201528 A1 | 9/2005 | Meer | |
| 2005/0201529 A1 | 9/2005 | Nelson | |
| 2005/0209995 A1 | 9/2005 | Aksu | |
| 2005/0259675 A1 | 11/2005 | Tuohino | |
| 2005/0287979 A1 | 12/2005 | Rollender | |
| 2006/0053225 A1 | 3/2006 | Poikselka | |
| 2006/0128395 A1 | 6/2006 | Mohonen | |
| 2006/0212558 A1 | 9/2006 | Sahinoja | |
| 2006/0212562 A1 | 9/2006 | Kushwaha | |
| 2006/0234639 A1 | 10/2006 | Kushwaha | |
| 2006/0234698 A1 | 10/2006 | Fok | |
| 2006/0239205 A1 | 10/2006 | Warren | |
| 2006/0258380 A1 | 11/2006 | Liebowitz | |
| 2007/0026854 A1 | 2/2007 | Nath | |
| 2007/0030539 A1 | 2/2007 | Nath | |
| 2007/0041513 A1 | 2/2007 | Gende | |
| 2007/0049288 A1 | 3/2007 | Lamprecht | |
| 2007/0117574 A1 | 5/2007 | Watanabe | |
| 2007/0117577 A1 | 5/2007 | Harris | |
| 2007/0160036 A1 | 7/2007 | Smith | |
| 2007/0253429 A1 | 11/2007 | James | |
| 2007/0254625 A1 | 11/2007 | Edge | |

| | | |
|---|---|---|
| 2008/0162637 A1 | 7/2008 | Adamczyk |
| 2009/0003535 A1 | 1/2009 | Grabelsky |
| 2009/0067417 A1 | 3/2009 | Kalavade |
| 2009/0097450 A1 | 4/2009 | Wallis |
| 2009/0221263 A1 | 9/2009 | Titus |
| 2010/0076767 A1 | 3/2010 | Vieri |

FOREIGN PATENT DOCUMENTS

| | | |
|---|---|---|
| WO | PCT/SE98/01887 | 10/1998 |
| WO | PCT/US99/28848 | 12/1999 |
| WO | PCT/US01/46666 | 11/2001 |
| WO | PCT/US01/46668 | 11/2001 |
| WO | PCT/US2005/022090 | 6/2005 |

OTHER PUBLICATIONS

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Peterson, A Presence-based GEOPRIV Location Object Format, Dec. 2005, pp. 1-24.

\* cited by examiner

ANCILLARY DATA SUPPORT IN SESSION INITIATION PROTOCOL (SIP) MESSAGING

The present application claims priority from U.S. Provisional Appl. No. 60/996,700, filed Nov. 30, 2007, entitled "Ancillary Data Reference For Session Initiation Protocol (SIP)", to Marshall et al., the entirety of which is expressly incorporated herein by reference.

BACKGROUND OF THE INVENTION

1. Field of the Invention

This invention relates generally to communications networks. More particularly, it relates to telecommunications networks including Voice Over Internet Protocol (VoIP) network communications, and most particularly to SIP (Session Initiation Protocol) emergency service messaging via IP telecommunications for voice, video, and text.

2. Background of the Related Art

Session Initiation Protocol (SIP) is a basic protocol for initiating interactive communication sessions (e.g., voice, video, chat, interactive games, virtual reality, etc.) between users. In given SIP-based applications, location of a particular wireless device is desired or required.

Currently, location and other caller-related data for the majority of calls (VoIP, cellular, or landline) is delivered or determined through multiple mechanisms. For instance, location and other data for the majority of calls is determined via the use of a unique query key (such as the telephone number or uniform resource identifier (URI)) to perform a database lookup. In these architectures, the unique query key (e.g., telephone number or URI) is used as a lookup element to query provisioned, staged or static information (e.g., from a suitable database) outside of the actual call signaling for location information. An exemplary technique and apparatus to inject a location object into a routing SIP message is disclosed in co-owned U.S. patent application Ser. No. 11/902,845, filed Sep. 26, 2007, the entirety of which is expressly incorporated herein by reference.

FIG. 3 shows a conventional exemplary Voice over Internet Protocol (VoIP) based routing architecture for a given Session Initiation Protocol (SIP) message.

In particular, as shown in FIG. 3, a Session Internet Protocol (SIP) message includes a unique query key, or location key (e.g., telephone number or URI) to be used to determine an action based on the initiator's location (i.e., position). As shown in FIG. 3, the SIP message including the unique query (e.g., location) key is passed to a positioning center 502.

Using the received location key, the positioning center 502 passes a query to an appropriate database 504, e.g., a database associating static location with various location key information. The static location database 504 determines the desired location information relating to the input location key, and returns the static location to the requesting positioning center 502.

Then, having obtained appropriate location information, the positioning center 502 passes a request to another database, e.g., a routing database 506, to obtain routing information associated with the received location information. The routing database 506 outputs appropriate routing information to the requesting positioning center 502. At that point, the positioning center 502 passes on the SIP message together with new routing information obtained from the routing database 506.

Standards development groups have created a mechanism for providing location associated to an endpoint or anchor point within a SIP session ("call"). Moreover, discussions have taken place promoting the idea of providing a limited set of URIs (Uniform Resource Identifiers) with the SIP messaging.

But a mechanism has not been heretofore provided to provide associated "ancillary" data with the call. The present inventors realize that such a mechanism is desired to support emergency calling as a primary application, and could be extended into commercial uses.

Disadvantages of the prior technology includes, e.g., providing a limited set of URIs, is not sufficient to cover all known or eventual types of data that are or will be required. Moreover, by providing URIs only, there is no provision for including (embedding) ancillary data within the SIP body part. Furthermore, body part(s) as a separate package can be easily encrypted while the headers remain in plain text. (Providing one or more URIs as the only option cannot ensure that the data associated with it will be delivered in an encrypted or digitally signed manner, whereas a mechanism for embedding the data within the SIP message itself allows for its encryption and/or digital signature as required.)

SUMMARY OF THE INVENTION

In accordance with the principles of the present invention, a Session Initiation Protocol (SIP) proxy server for facilitating inclusion of auxiliary data along with location in a SIP session comprises a first communication path to receive a SIP message from an initiator of the SIP message. A proxy module associates auxiliary information identified in a SIP header of the SIP message with the received SIP message. A second communication path provides access to a recipient of the SIP message. In this way, aside from the association to the auxiliary information, the SIP message further includes current location information relating to a current position of the initiator.

BRIEF DESCRIPTION OF THE DRAWINGS

Features and advantages of the present invention will become apparent to those skilled in the art from the following description with reference to the drawings which.

DETAILED DESCRIPTION OF ILLUSTRATIVE EMBODIMENTS

The present invention diverges from current NENA standards by providing ancillary data via a finite set of highly constrained universal resource indicators (URIs) (e.g., carrier_name_address@somedomain.com).

The present invention leverages the model already created for associated location in SIP, (e.g., Presence Identity Document Format—Location Object (PIDF-LO)), we specify a new technique, based on an XML/tagged structure, and for the provision of ancillary data associated with a call, aside from location, within the SIP header.

The invention utilizes techniques standardized in the Internet Engineering Task Force (IETF) for transporting location, but that in accordance with the invention, ancillary information, aside from or in addition to location associated with an emergency SIP session (call), is transported in a SIP header.

Figure 1:
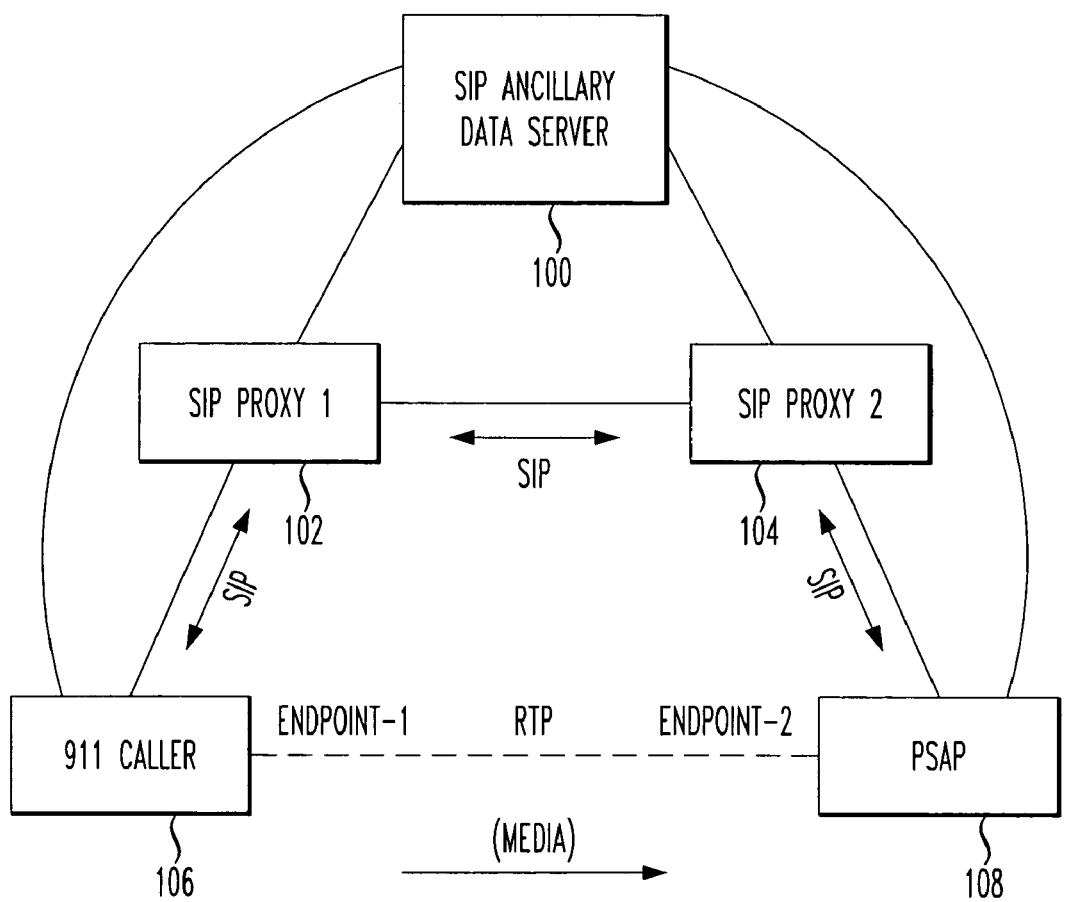
FIG. 1 shows inclusion of a SIP ancillary data server for temporarily hosting auxiliary data for an emergency SIP session (call) uniquely referred to in a transported SIP header, in accordance with the principles of the present invention.

FIG. 1 shows inclusion of a SIP ancillary data server for temporarily hosting auxiliary data for an emergency SIP session (call) uniquely referred to in a transported SIP header, in accordance with the principles of the present invention.

In particular, as shown in FIG. 1, a SIP ancillary data server 100 hosts ancillary data (e.g., a photo of an emergency scene, live streaming video from an emergency scene, a medical history of a patient in need of emergency care, etc.) The hosted data may be live (e.g., streaming video), may be pseudo-live (e.g., a video or photo taken at the emergency scene, uploaded to an appropriate hosting site (the SIP ancillary data server 100), or may be static (e.g., a medical history). Moreover, the hosted data may or may not be retained within a common platform, i.e., within a single SIP ancillary data server 100.

In the given example of an emergency SIP session (call), an emergency caller 106 establishes a SIP session with an emergency services center functioning as a first SIP proxy 102. Using techniques outside of the present invention, an appropriate public service access point (PSAP) 108 is determined based on a location of the emergency caller 106. The emergency caller 106 then establishes a SIP session (call) with the appropriate PSAP 108 via respective SIP proxies 102, 104.

Figure 2:
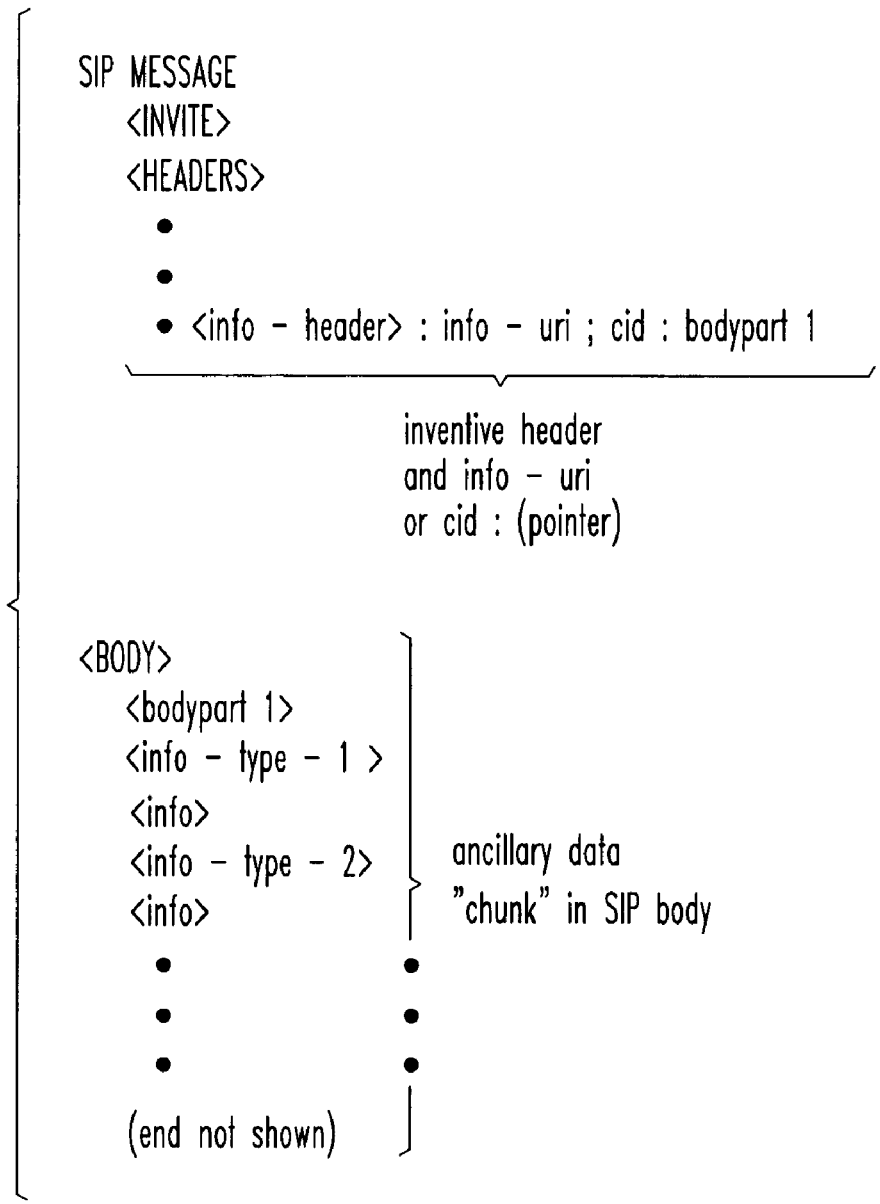
FIG. 2 shows an exemplary SIP message format, in accordance with the principles of the present invention.
Figure 3:
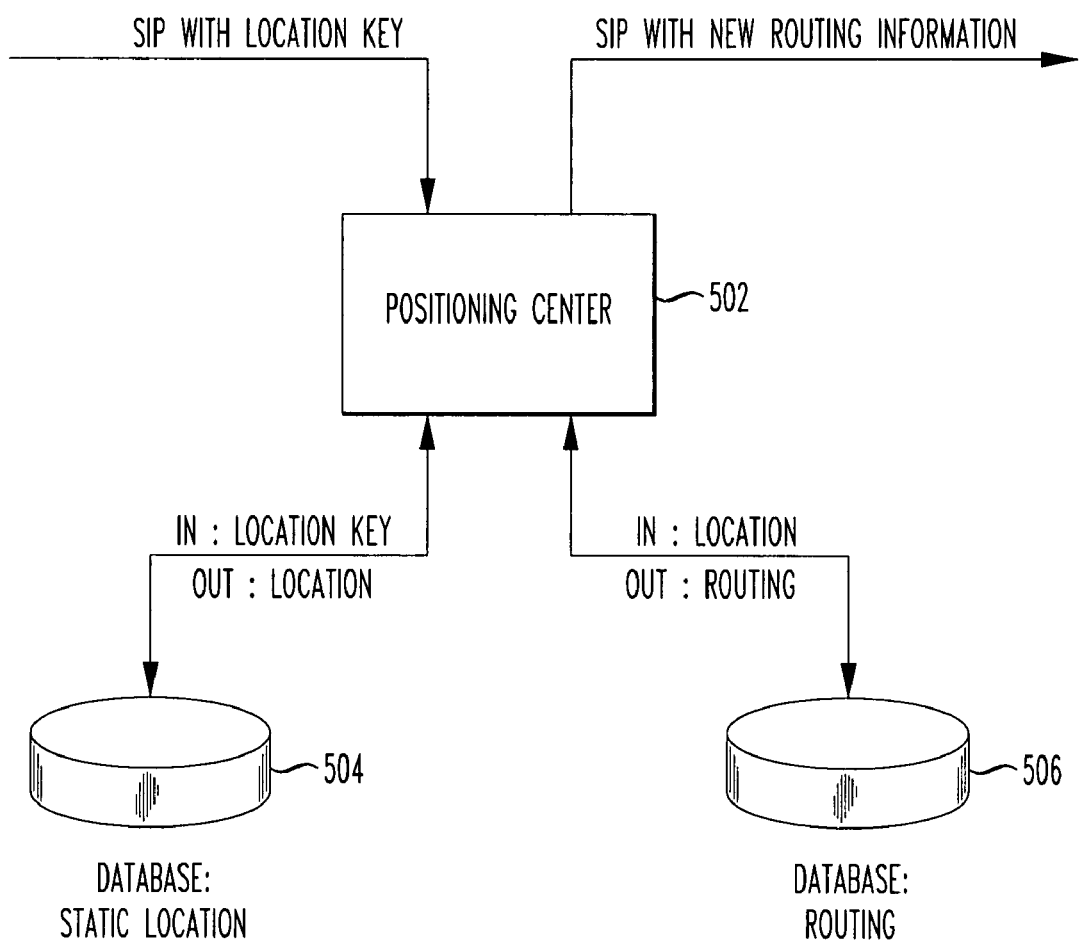
FIG. 3 shows a conventional exemplary Voice over Internet Protocol (VoIP) based routing architecture.

FIG. 2 shows an exemplary SIP message format, in accordance with the principles of the present invention.

In particular, as shown in FIG. 2, in accordance with the principles of the present invention, in a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

The content pointer (cid:) element makes reference to a structured XML form contained within the SIP message body.

The content <information_URI> (info_URI) makes reference to an external service (e.g., to the SIP ancillary data server 100 shown in FIG. 1) which contains ancillary information. Alternatively, the info_URI may provide a level of redirection to the information (e.g., a universal resource identifier (URI)).

The ancillary information, whether embedded locally in the SIP message, or provided (via request or response to a request) based on the info_URI, is preferably structured as XML/tagged data. The ancillary information is referred to herein collectively as an information object (IO).

The information object (IO) document structure preferably includes one or more sections representing any of many types of ancillary information.

The information object (IO) document is preferably arranged sequentially by Information Type, (e.g., Medical data, Measurement data, Statistics, Profile information, or Multimedia-related information). Preferably, the information object (IO) is infinitely extensible to contain any number of information data types.

The (IO) information object may contain actual data, or one or more reference URIs pointing to some data service, or any combination of both. For instance, as shown in FIG. 1, the IO information object may point to ancillary data temporarily hosted in a SIP ancillary data server 100.

The invention permits ancillary data of any kind to be linked to an emergency SIP call. Moreover, any of the varying types of ancillary data can be registered as standard data types (e.g., IANA Registry).

While shown and described with reference to an emergency SIP call, the principles of the present invention are extensible to any SIP session, including non-emergency cases.

The information within the SIP body can be encrypted and/or digitally signed as required.

Potential current markets for the invention include, for example, Voice over Internet Provider (VoIP) service providers, emergency service providers, or information service providers.

Those that may make particular use of the invention include any/all communications users, including VoIP, wireless and/or landline users, as well as VoIP service providers.

While the invention has been described with reference to the exemplary embodiments thereof, those skilled in the art will be able to make various modifications to the described embodiments of the invention without departing from the true spirit and scope of the invention.

What is claimed is:

1. A Session Initiation Protocol (SIP) proxy server for facilitating inclusion of auxiliary data along with location in a SIP session, comprising:
   a first communication path to receive, from an initiator device, an emergency SIP message including a SIP header comprising current location information of said initiator device and auxiliary information;
   a second communication path to a recipient device for said emergency SIP message;
   wherein said auxiliary information includes a content pointer element pointing to a source of auxiliary emergency information associated with said emergency SIP message.

2. The Session Initiation Protocol (SIP) proxy server for facilitating inclusion of auxiliary data along with location in a SIP session according to claim 1, wherein:
   said content pointer element points to a SIP Message body part.

3. The Session Initiation Protocol (SIP) proxy server for facilitating inclusion of auxiliary data along with location in a SIP session according to claim 2, wherein said content pointer element comprises:
   a content identifier.

4. The Session Initiation Protocol (SIP) proxy server for facilitating inclusion of auxiliary data along with location in a SIP session according to claim 1, wherein said SIP header comprises:
   a universal resource identifier (URI) relating to an IP address of said associated auxiliary emergency information.

5. The Session Initiation Protocol (SIP) proxy server for facilitating inclusion of auxiliary data along with location in a SIP session according to claim 1, wherein:
   said emergency SIP message is an emergency call.

6. The Session Initiation Protocol (SIP) proxy server for facilitating inclusion of auxiliary data along with location in a SIP session according to claim 1, wherein:
   said auxiliary emergency information is audio relating to said emergency SIP message.

7. The Session Initiation Protocol (SIP) proxy server for facilitating inclusion of auxiliary data along with location in a SIP session according to claim 1, wherein:
   said auxiliary emergency information is video relating to said emergency SIP message.

8. The Session Initiation Protocol (SIP) proxy server for facilitating inclusion of auxiliary data along with location in a SIP session according to claim 1, wherein:
   said auxiliary emergency information is textual data.

9. The Session Initiation Protocol (SIP) proxy server for facilitating inclusion of auxiliary data along with location in a SIP session according to claim 1, wherein:
said auxiliary emergency information provides a universal resource locator (URL) of a web site containing information relating to said emergency SIP message.

10. The Session Initiation Protocol (SIP) proxy server for facilitating inclusion of auxiliary data along with location in a SIP session according to claim 1, wherein:
said sender of said emergency SIP message is a wireless device.

11. A method of facilitating inclusion of auxiliary data along with location in a Session Initiation Protocol (SIP) session, comprising:
receiving, from an initiator device, an emergency SIP message including current location information of said initiator device and auxiliary information;
establishing a second communication path to a recipient device for of said emergency SIP message;
wherein said auxiliary information includes a content pointer element pointing to a source of auxiliary emergency information associated with said emergency SIP message.

12. The method of facilitating inclusion of auxiliary data along with location in a Session Initiation Protocol (SIP) session according to claim 11, wherein:
said content pointer element points to a SIP Message body part.

13. The method of facilitating inclusion of auxiliary data along with location in a Session Initiation Protocol (SIP) session according to claim 12, wherein said content pointer element comprises:
a content identifier.

14. The method of facilitating inclusion of auxiliary data along with location in a Session Initiation Protocol (SIP) session according to claim 11, wherein said SIP header comprises:
a universal resource identifier (URI) relating to an IP address of said associated auxiliary emergency information.

15. The method of facilitating inclusion of auxiliary data along with location in a Session Initiation Protocol (SIP) session according to claim 11, wherein:
said emergency SIP message is an emergency call.

16. The method of facilitating inclusion of auxiliary data along with location in a Session Initiation Protocol (SIP) session according to claim 11, wherein:
said auxiliary emergency information is audio relating to said emergency SIP message.

17. The method of facilitating inclusion of auxiliary data along with location in a Session Initiation Protocol (SIP) session according to claim 11, wherein:
said auxiliary emergency information is video relating to said emergency SIP message.

18. The method of facilitating inclusion of auxiliary data along with location in a Session Initiation Protocol (SIP) session according to claim 11, wherein:
said auxiliary emergency information is video relating to said emergency SIP message.

19. The method of facilitating inclusion of auxiliary data along with location in a Session Initiation Protocol (SIP) session according to claim 11, wherein:
said auxiliary emergency information provides a universal resource locator (URL) of a web site containing information relating to said emergency SIP message.

20. The method of facilitating inclusion of auxiliary data along with location in a Session Initiation Protocol (SIP) session according to claim 11, wherein:
said sender of said emergency SIP message is a wireless device.

* * * * *